United States Patent
Wentink et al.

(10) Patent No.: US 10,091,636 B2
(45) Date of Patent: Oct. 2, 2018

(54) PROBE MESSAGING FOR DIRECT LINK CONNECTIONS

(71) Applicant: QUALCOMM Incorporated, San Diego, CA (US)

(72) Inventors: Maarten Menzo Wentink, Naarden (NL); Krishnan Rajamani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 15/040,596

(22) Filed: Feb. 10, 2016

(65) Prior Publication Data

US 2017/0230811 A1   Aug. 10, 2017
US 2018/0054723 A9   Feb. 22, 2018

Related U.S. Application Data

(63) Continuation of application No. 13/297,978, filed on Nov. 16, 2011, now Pat. No. 9,271,136.

(Continued)

(51) Int. Cl.
*H04W 8/00* (2009.01)
*H04W 76/12* (2018.01)
(Continued)

(52) U.S. Cl.
CPC .............. *H04W 8/005* (2013.01); *H04W 8/24* (2013.01); *H04W 76/10* (2018.02); *H04W 76/12* (2018.02); *H04W 84/12* (2013.01)

(58) Field of Classification Search
CPC combination set(s) only.
See application file for complete search history.

(56) References Cited

U.S. PATENT DOCUMENTS 5,745,699 A    4/1998  Lynn et al.
7,594,268 B1   9/2009  Sobel
(Continued)

FOREIGN PATENT DOCUMENTS

CN   101472318 A   7/2009
EP   2076091 A2    7/2009
(Continued)

OTHER PUBLICATIONS

Anonymous: IEEE Standard for Technology—Telecommunications information exchange between systems—Local and metropolitan area networks—Specific requirements Part 11: Wireless LAN Medium Access Control (MAC) and Physical Layer (PHY) specifications Amendment 7: Extensions to Direct-Link Setup ( D" IEEE Standard, IEEE, Piscataway, NJ, USA, Oct. 14, 2010 (Oct. 14, 2010), pp. I-XII,1, XP002617166, DOI: 10.1109/IEEESTD.2010.5605400, ISBN: 978-0-7381-6499-1, Retrieved from the Internet: URL:http://standards.ieee.org/getieee802/download/802.11z-2010.pdf [retrieved on Jan. 17, 2011]. pp. 17-18, 23-37, 74-82.

(Continued)

*Primary Examiner* — Yee Lam
(74) *Attorney, Agent, or Firm* — The Marbury Law Group

(57) ABSTRACT

There lies a challenge to develop a technique of effectively establishing a direct communication link between client devices in a communication network. In some implementations, an associated STA is a client device which is associated with a particular access point (AP). A non-associated STA is a client device which is not associated with the AP. A tunneled probe request may be transmitted by an associated STA through the AP to be broadcast to other associated STAs. In some implementations, an active scan may be combined with a tunneled probe request in order to establish (Continued)

a communication link between an associated STA and a non-associated STA.

36 Claims, 12 Drawing Sheets

Related U.S. Application Data

(60) Provisional application No. 61/415,622, filed on Nov. 19, 2010, provisional application No. 61/417,532, filed on Nov. 29, 2010.

(51) Int. Cl.
*H04W 76/10* (2018.01)
*H04W 8/24* (2009.01)
*H04W 84/12* (2009.01)

(56) References Cited

U.S. PATENT DOCUMENTS

| | | | |
|---|---|---|---|
| 7,984,160 B2 | 7/2011 | Lam | |
| 8,064,374 B2 | 11/2011 | Kakani et al. | |
| 8,077,683 B2 | 12/2011 | Rudolf et al. | |
| 8,149,745 B2 | 4/2012 | Itagaki et al. | |
| 8,208,451 B2 | 6/2012 | Seok | |
| 8,243,623 B2 | 8/2012 | Gong et al. | |
| 8,259,632 B2 | 9/2012 | Seok et al. | |
| 8,462,667 B2 | 6/2013 | Gong et al. | |
| 8,514,799 B2 | 8/2013 | Kim et al. | |
| 8,570,945 B2 | 10/2013 | Seok | |
| 8,665,844 B2 | 3/2014 | Seok | |
| 8,737,370 B2 | 5/2014 | Wentink | |
| 8,824,435 B2 | 9/2014 | Seok et al. | |
| 8,892,874 B2 | 11/2014 | Reznik et al. | |
| 9,609,676 B1* | 3/2017 | Bijwe | H04W 8/005 |
| 2009/0168689 A1 | 7/2009 | Itagaki et al. | |
| 2010/0218198 A1* | 8/2010 | Ruan | G06F 13/387 719/327 |
| 2011/0103264 A1* | 5/2011 | Wentink | H04W 8/005 370/255 |
| 2011/0122835 A1* | 5/2011 | Naito | H04W 76/023 370/329 |
| 2011/0149798 A1 | 6/2011 | Cordeiro et al. | |
| 2012/0155350 A1* | 6/2012 | Wentink | H04W 8/005 370/311 |
| 2013/0114586 A1* | 5/2013 | Kim | H04L 5/0091 370/338 |
| 2013/0227152 A1* | 8/2013 | Lee | H04W 48/16 709/227 |

FOREIGN PATENT DOCUMENTS

| | | |
|---|---|---|
| JP | 2003249939 A | 9/2003 |
| JP | 2011503999 A | 1/2011 |
| WO | 2005081123 A1 | 9/2005 |
| WO | WO-2006081123 A2 | 8/2006 |
| WO | WO-2009064113 A2 | 5/2009 |
| WO | WO-2009113834 A2 | 9/2009 |
| WO | WO-2009134066 A1 | 11/2009 |
| WO | 2010117530 A2 | 10/2010 |

OTHER PUBLICATIONS

International Search Report and Written Opinion—PCT/US2011/061151—ISA/EPO—dated Jan. 24, 2012.
Montemurro M., et al., Research in Motion; Menzo Wentink, Qualcomm: "doc: IEEE 802.11-09/1218r7; TDLS Peer Discovery", IEEE 802.11, Jan. 18, 2010 (Jan. 18, 2010), pp. 1-13, XP000002656379, Retrieved from the Internet: URL:https://mentor.ieee.org/802.11/dcn/09/11-09-1218-07-000z-tdls-peer-discovery.doc [retrieved on Aug. 4, 2011].

* cited by examiner

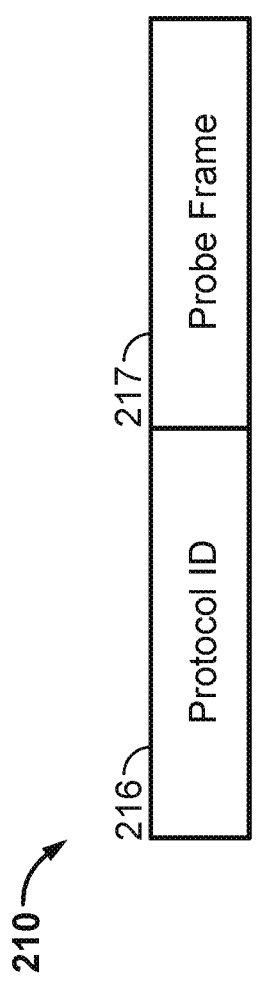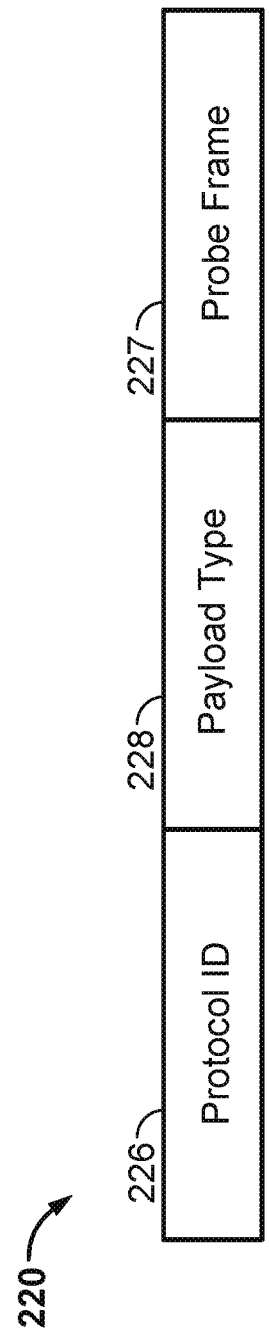
Figure 2A
Figure 2B

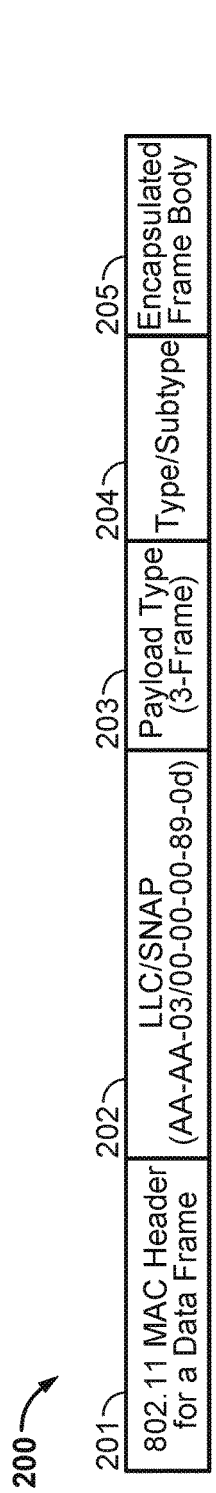
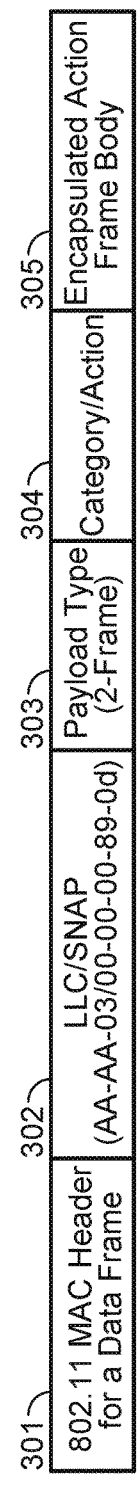
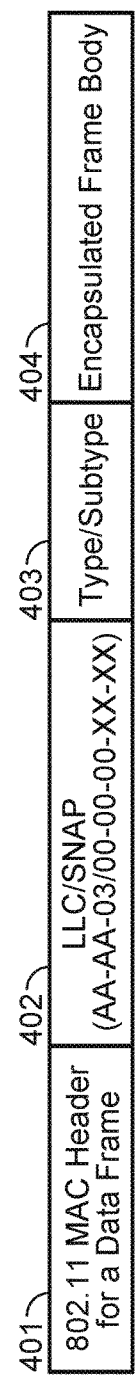
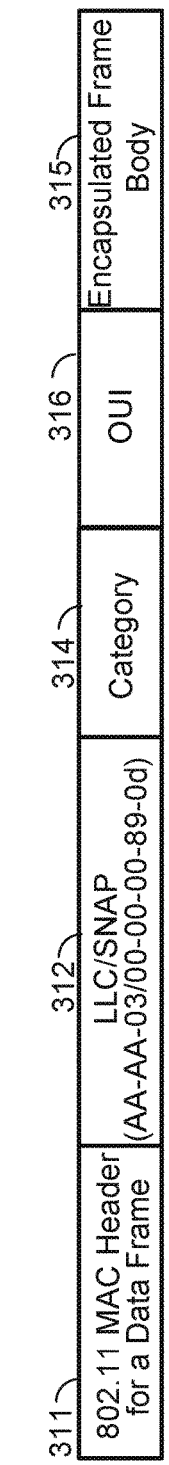
Figure 2C
Figure 2D
Figure 2E
Figure 2F

PROBE MESSAGING FOR DIRECT LINK CONNECTIONS

CROSS REFERENCE TO RELATED APPLICATIONS

This application is a continuation of, and claims the benefit of priority to, U.S. Non-Provisional patent application Ser. No. 13/287,978 entitled, "PROBE MESSAGING FOR DIRECT LINK CONNECTIONS", filed Nov. 16, 2011, and claims priority benefit under 35 U.S.C. § 119(e) to U.S. Provisional Patent Application No. 61/415,622 entitled, "DISCOVERY FOR DIRECT LINK CONNECTIONS" filed on Nov. 19, 2010, and U.S. Provisional Patent Application No. 61/417,532 entitled, "DISCOVERY FOR DIRECT LINK CONNECTIONS," filed on Nov. 29, 2010, each of which is hereby incorporated by reference in their entirety.

BACKGROUND

Field

The present application relates to wireless communication, and in particular, to systems, methods and devices to enable device discovery in wireless local area network (WLAN) systems.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks. However, wireless communication requires significant active resource management among the network users and higher levels of mutual coordination and cooperation for compatible spectrum utilization.

SUMMARY OF THE INVENTION

Various embodiments include systems, methods and devices within the scope of the appended claims, each having several aspects, where no single one of which is solely responsible for the desirable attributes described herein. Without limiting the scope of the appended claims, certain prominent features are described herein. After considering this discussion, and particularly after reading the section entitled "Detailed Description," one will understand how the features of various embodiments are used to establish communication links between devices, and the like.

According to one aspect, an apparatus for wireless communication is disclosed. The apparatus includes a message generating module configured to generate a message, the message including an encapsulated probe frame, a channel selection module configured to select a first communication channel during a first time period and a second communication channel during a second time period, and a transmission module configured to transmit the message to a first communication device through an access point during the first time period and directly to a second communication device during the second time period.

According to another aspect, a method of wireless communication implemented in a wireless device is disclosed. The method includes generating a probe frame, encapsulating the probe frame in a message, selecting one of a first channel for transmitting the message through an access point (AP) during a first time period to a first communication device and a second channel for transmitting the message directly to a second communication device during a second time period, and transmitting the message.

According to another aspect, an apparatus of wireless communication is disclosed. The apparatus includes means for generating a probe frame, means for encapsulating the probe frame in a message, means for selecting one of a first channel for transmitting the message through an access point (AP) during a first time period to a first communication device and a second channel for transmitting the message directly to a second communication device during a second time period, and means for transmitting the message.

According to another aspect, a computer program product for processing data for a program configured to operate instructions in a wireless communication device is disclosed. The computer program product includes a non-transitory computer-readable medium having stored thereon code for causing processing circuitry to generate a probe frame, encapsulate the probe frame in a message, select one of a first channel for transmitting the message through an access point (AP) during a first time period to a first communication device and a second channel for transmitting the message directly to a second communication device during a second time period, and transmit the message.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 2A-2F illustrate examples of a message according to some implementations.

FIGS. 3A-3E illustrate examples of a message according to some implementations.

DETAILED DESCRIPTION

Figure 1:
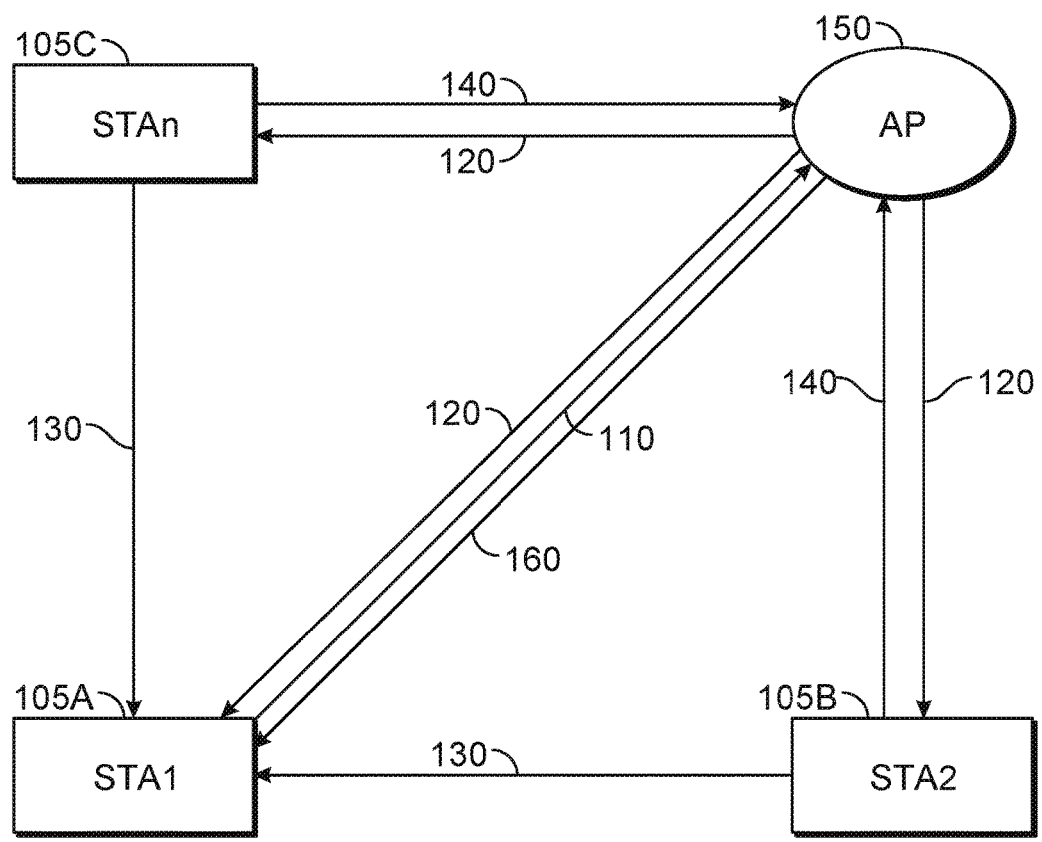
FIG. 1 is a simplified block diagram of several sample aspects of communication components.

Popular wireless network technologies may include various types of wireless local area networks (WLANs). A WLAN may be used to interconnect nearby devices together, employing widely used networking protocols. The various embodiments described herein may apply any communication standard, such as WiFi or, more generally, any member of the IEEE 802.11 family of wireless protocols.

In some implementations, a WLAN includes various devices which are the components that access the wireless network. For example, there may be two types of devices: access points (APs) and clients (also referred to a stations, or STAs). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

In another aspect, wireless networks may operate in infrastructure mode. In infrastructure mode, a STA connects to an AP which serves as a hub for connecting with other wireless clients to the network infrastructure, including, for example, Internet access. Infrastructure mode uses a client-server architecture to provide connectivity to the other wireless clients. In one aspect, wireless networks generate a periodic Beacon signal which broadcasts wireless network characteristics (e.g., maximum data rate, encryption status, AP MAC address, SSID, etc.) to all nearby clients. For example, a service set identifier (SSID) may identify a particular wireless network.

Establishing a direct connection between wireless clients requires discovery of a wireless client device which is capable of establishing a direct connection. A wireless device, or client, associated with a home network may be referred to as an associated STA A wireless protocol (e.g., IEEE 802.11, or the like) may define a protocol enabling wireless STAs associated with an AP to set up a direct link between them. One such protocol is tunneled direct link setup (TDLS). As described herein, TDLS setup messages may be encapsulated in a message (e.g., a data unit such as a protocol data unit (PDU)) according to a specific ethertype, so that they can be tunneled through an AP. In an example, the ethertype is specified in a field within an Ethernet frame, indicating the protocol used for encapsulating the payload in the message. According to the TDLS protocol, a TDLS setup message may include a discovery request that is sent to associated STAs. The discovery request may then be responded to by STAs which are TDLS capable through a TDLS discovery response. Since the TDLS discovery request and response are encapsulated according to the ethertype used by the AP, the AP does not have to be upgraded in order for TDLS to be used between two associated STAs because all the AP sees are messages encapsulated according to the ethertype. Thus, TDLS direct links can be set up between two TDLS capable STAs without a need to upgrade the AP.

According to some implementations, a probe frame may also be encapsulated in a portion of a message. A probe frame includes, for example, such messages as a probe request and a probe response, but is not limited thereto. A probe request may include information required for establishing a direct communication link between associated STAs. The client device may be capable of processing the message upon detection of the encapsulated probe frame. For example, if a data frame has a probe identifier in one the portions of the message described below with respect to FIGS. 2A-2F and FIGS. 3A-3E, it may generate an appropriate response. Further for example, the client device may be capable of processing a message with an encapsulated probe frame body according to a protocol defined by a standard, for example, the WiFi alliance (WFA) standard, as will be discussed with respect to FIG. 2C below. APs would not have to be upgraded for processing a probe frame exchanged between two STAs since the tunneled probe request/response may be encapsulated in a data message. Thus, direct communication links can be set up between two client device STAs without upgrading the AP because the AP may forward the tunneled probe frames within a message without any additional processing.

FIG. 1 is a simplified block diagram of several sample aspects of communication components according to some implementations. The communication components include an access point (AP) 150, and a plurality of client devices (STAs). A first STA1 (105A) may represent a client device which is a source of a tunneled probe request. The tunneled probe request may include the information to directly connect to one or more of STAs in the communication network. For example, the tunneled probe request may include the direct network address of the source STA, such that a receiving STA may directly communicate with the source STA. STA1 (105A) may generate and transmit a tunneled probe request, as represented by tunneled probe request transmission 110, to the other associated STAs in the communication network through the AP 150. The AP 150 may transparently forward the information in the tunneled probe request in a broadcast 120 to the STAs associated with the AP 150. Associated STAs may be any of STA1 (105A), STA2 (105B), and STAn (105C). As represented by STAn (105C), any number of STAs may be associated with the AP 150. The receiving STAs 105B, 105C, may then generate and transmit a probe response 130 to STA1. Additionally, a receiving STA (e.g., STA2 105B, STAn 105C), may generate and transmit a tunneled probe response 140 to the AP 150. The AP may then transmit the tunneled probe response 160 to the STA1 (105A). According to some implementations, all STAs that have received the tunneled probe request broadcast, excluding the source STA 105A, are regarded as receiving STAs.

The encapsulation of a probe frame in a message will now be described with reference to FIGS. 2A-2F. FIG. 2A illustrates a first example of a message 210 including an encapsulated probe frame 217. The message 210 may include a portion including a protocol identifier 216 and a portion including the probe frame 217. The message 210 may also include a payload type field, a category/action field, and a type/subtype field arranged in any number of variations with respect to the probe frame 217 as will be discussed with reference to FIGS. 2B-2F below. The probe frame 217 may also be generally described and referred to as a payload.

FIG. 2B is another example of a message 220 including three portions corresponding to an encapsulation protocol. The message 220 may contain a protocol identifier 226, a payload type field 228, and a probe frame 227. The payload type field 228 may indicate the presence of a probe frame 227. A probe frame 227 may include information regarding either a probe request or a probe response, or additional information regarding capabilities of the STA. A probe frame 227 may also be generally described and referred to as a payload.

The content of the messages 210 and 220 discussed above will be described in greater detail with reference to the examples of FIGS. 2C-2F. FIG. 2C illustrates an example of a message 200 according to some implementations. A probe frame may be generated by an associated STA. The probe frame may be encapsulated in the message 200. The message 200 may include protocol layers or fields 201-205. Fields of the message 200 may include a MAC header 201, a logical link control (LLC)/subnetwork access protocol (SNAP) header 202, a payload type field 203, a type/subtype field 204, and an encapsulated frame body (EFB) 205. A MAC header 201 may contain information regarding a source address of a message, a destination address of a data unit and/or a message, and a message type as will be discussed further with respect to FIGS. 5A-5D below. The LLC/SNAP header 202 may contain, for example, eight octets. The first three octets may correspond to an LLC header. An LLC header, for example AA-AA-03, may indicate that a SNAP header is present. The next three octets of LLC/SNAP header 202 may contain the SNAP header. A SNAP organizationally unique identifier (OUI), for example 00-00-00, may indicate the presence of an ethertype as a SNAP physical identifier (PID).

The last two octets of a LLC/SNAP header 202 may correspond to an ethertype. An ethertype may identify an associated protocol of the message. For example, an ethertype may identify a protocol field subsequent to the LLC/SNAP header 202. With reference to FIG. 2C, an ethertype 89-0d may identify, for example, an 802.11 encapsulation protocol. The message 200 may be an example of an encapsulation protocol defined in 802.11. An 802.11 encapsulation protocol may include a payload type field 203 as a first portion of the message 200 following the LLC/SNAP header 202. The payload type field 203 may have any number of values associated therewith. With reference to FIG. 2C, the payload type field 203 may have a value of 3, indicating a probe frame is encapsulated. A type/subtype field 204 may indicate the type and subtype of the EFB 205. The EFB 205 may include the encapsulated probe frame. As a result, a direct connection link may be established between devices which may or may not have TDLS discovery capability as described above.

FIG. 2D illustrates an example of a message 300 according to some implementations. Protocol fields 301-303 may be similar to protocol fields 201-203 described above in relation to FIG. 2C. Referring to FIG. 2D, a payload type 303 may have a value of 2, indicating a TDLS encapsulation protocol. A TDLS encapsulation protocol may include a category/action field 304.

The category/action field 304 may indicate an action frame category and a specific action frame. The message 300 may include an encapsulated action frame body (EAFB) 305 following the category/action field 304. The EAFB 305 may be configured as a TDLS frame body and may include TDLS instructions as discussed above, including a TDLS discovery request frame and a TDLS discovery response frame. The category/action field 304 may have unassigned data bits that may be reassigned to include a probe frame. The unassigned data bits may be configured to include the additional information required for a probe request and a probe response. Thus, a TDLS encapsulation protocol may be used for a probe frame, as indicated by a value of the category/action field 304. For example, reserved category field bits 5-126 as defined by IEEE 802.11 may be reassigned to include the probe frame information. Additionally or alternatively, reserved action field bits 16-255 as defined by IEEE 802.11 may be reassigned to include the probe frame information.

FIG. 2E illustrates another example of a message 400 according to some implementations. Protocol fields 401-402 may be similar to protocol fields 201-202 and 301-302 respectively, as described above. An LLC/SNAP 402, as illustrated in FIG. 2C, may be configured to include an ethertype which identifies an encapsulation protocol not defined by IEEE. As represented by the ethertype value of XX-XX in FIG. 2C, the ethertype may identify any number of encapsulation protocols for a message 400. For example, the encapsulation protocol may correspond to an encapsulation protocol of a Wireless Fidelity (Wi-Fi) Alliance (WFA). Thus, the message encapsulation protocol may not need to correspond to a protocol defined by any particular standard.

FIG. 2F illustrates another example of a message 310 according to some implementations. The example illustrated in FIG. 2F is similar to the examples illustrated in FIGS. 2C and 2D in that protocol fields 311-312 may be similar to protocol fields 201-202, and 301-302 described above with reference to FIGS. 2C-2D. As illustrated in FIG. 2F, an LLC/SNAP header 312 may be followed by a payload type field 313 and a category field 314. The payload type field 313 may have a value of 2, indicating a TDLS encapsulation protocol. The value of the category field 314 may indicate the presence of a particular encapsulated frame body 315. For example, a category field 314 having a value of 127 may indicate that a the encapsulated frame body 315 (e.g., probe request frame or probe response frame) corresponds to a vendor specific action frame body. The message 310 may also include a separate Organizationally Unique Identifier (OUI) field 316 for identifying a particular standard. For example, the OUI field 316 may identify a standard corresponding to WFA.

An ethertype value corresponding to various protocols allows for the assignment of other values to a type/subtype 403 and an EFB 404 than those specified by any particular protocol. For example, an ethertype value corresponding to a protocol registered to WFA would allow the type/subtype field 403 to take on other values than those defined by the IEEE 802.11 protocol.

Each of the messages 200, 300, 400, and 310 discussed above may contain a greater or fewer number of fields as illustrated in FIGS. 2A and 2B above. Fields may also be referred to as layers or portions of the message 200, 300, 400, and 310 which correspond to the encapsulation protocol. The arrangement and number of the fields of the message is not particularly limited to those describe with respect to FIGS. 2A-2F above.

Figure 3D:
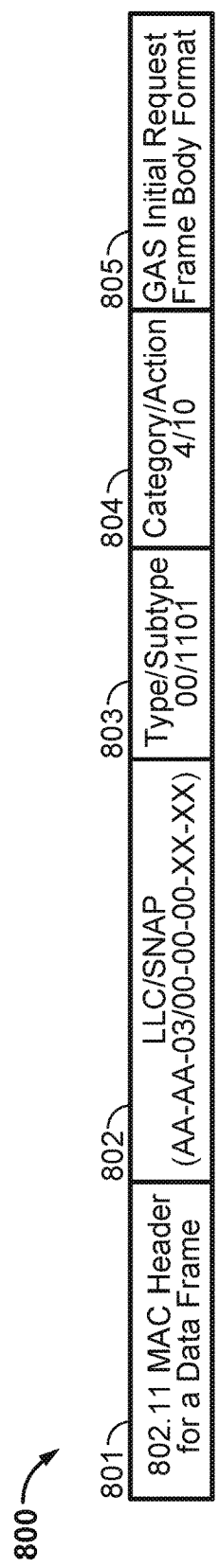

FIGS. 3A-3E show various configurations of a message according to some implementations of the message of FIG. 2C. FIGS. 3A-3E respectively illustrate example formats for messages 500, 600, 700, 800, and 900. Protocol fields 501-502, 601-602, 701-702, 801-802, and 901-902 may be similar to protocol fields 201-202 and 301-302 respectively, as described above. With reference to FIG. 3A, a type/subtype field 503 may be set to a value indicating the presence of a probe request frame body. The type/subtype field 503 may be set to the type and subtype of a probe request frame. For example, the type may be set to a management type, and the subtype may be set to a probe request type. As illustrated in FIG. 3A, the type/subtype field 503 may be set to 00/0100 to represent a probe request type, but is not limited thereto. The EFB 504 may include a probe request frame body as illustrated in FIG. 3A. The probe request frame included in EFB 504 may include one or more of an SSID element, a supported rates element, an extended supported rates element, and one or more vendor specific elements.

Alternatively, the subtype field may indicate a probe response type. As illustrated in FIG. 3B, a type/subtype field 603 may be set to 00/0101 to represent a probe response type, but is not limited thereto. The EFB 604 may include a corresponding encapsulated frame body including a probe response frame. The probe response frame included in EFB 604 may include one or more of a timestamp, beacon interval, device capability, SSID, a supported rates element, and country of origin.

Furthermore, the type/subtype field may be set to indicate an action frame body. As illustrated by message 700 in FIG. 3C, a type/subtype field 703 may be set to a value of 00/1101 to represent an EFB 704 including an action frame body. An action frame body may include a category field, an action field, and any number of vendor specific information elements.

Figure 3E:
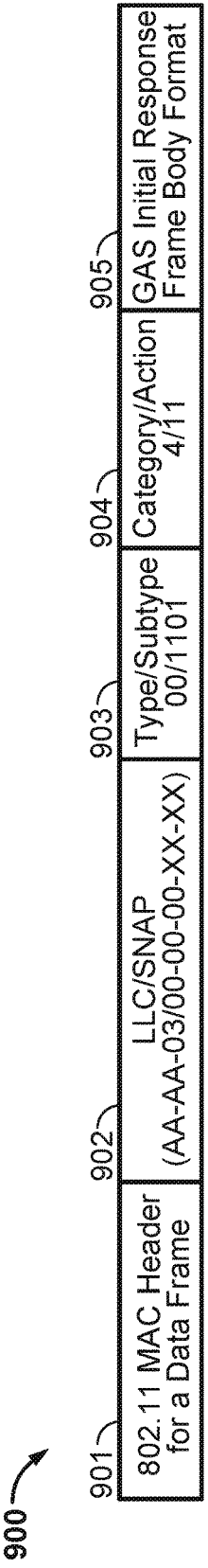

For example, as illustrated in message 800 of FIG. 3D, a category/action field 804 may be set to represent a public action frame (Category 4) and a Generic Advertisement Service (GAS) initial request frame body (Action 10). Alternatively, as illustrated in FIG. 3E, a category/action field 804 may be set to represent a public action frame (Category 4) and a Generic Advertisement Service (GAS) initial response frame body (Action 11).

While certain examples have been illustrated with respect to the use of certain values for a type/subtype field and a category/action field, the values of these fields are not limited to those discussed above. Any number of values may be used to define a type/subtype field and a category/action field to represent various encapsulated frame bodies. Furthermore, each of fields 205, 305, 404, 315, 217, 227. 504, 604, 704, 805, and 905 as discussed above may be referred to as a payload of each of the respective messages. A payload may include probe information, which may be in the form of an encapsulated probe frame. A probe frame may include a probe request or a probe response as discussed above. Furthermore, various fields of messages 210, 220, 200, 300, 310, and 400, may also be referred to as portions or layers of the respective messages.

Figure 4:
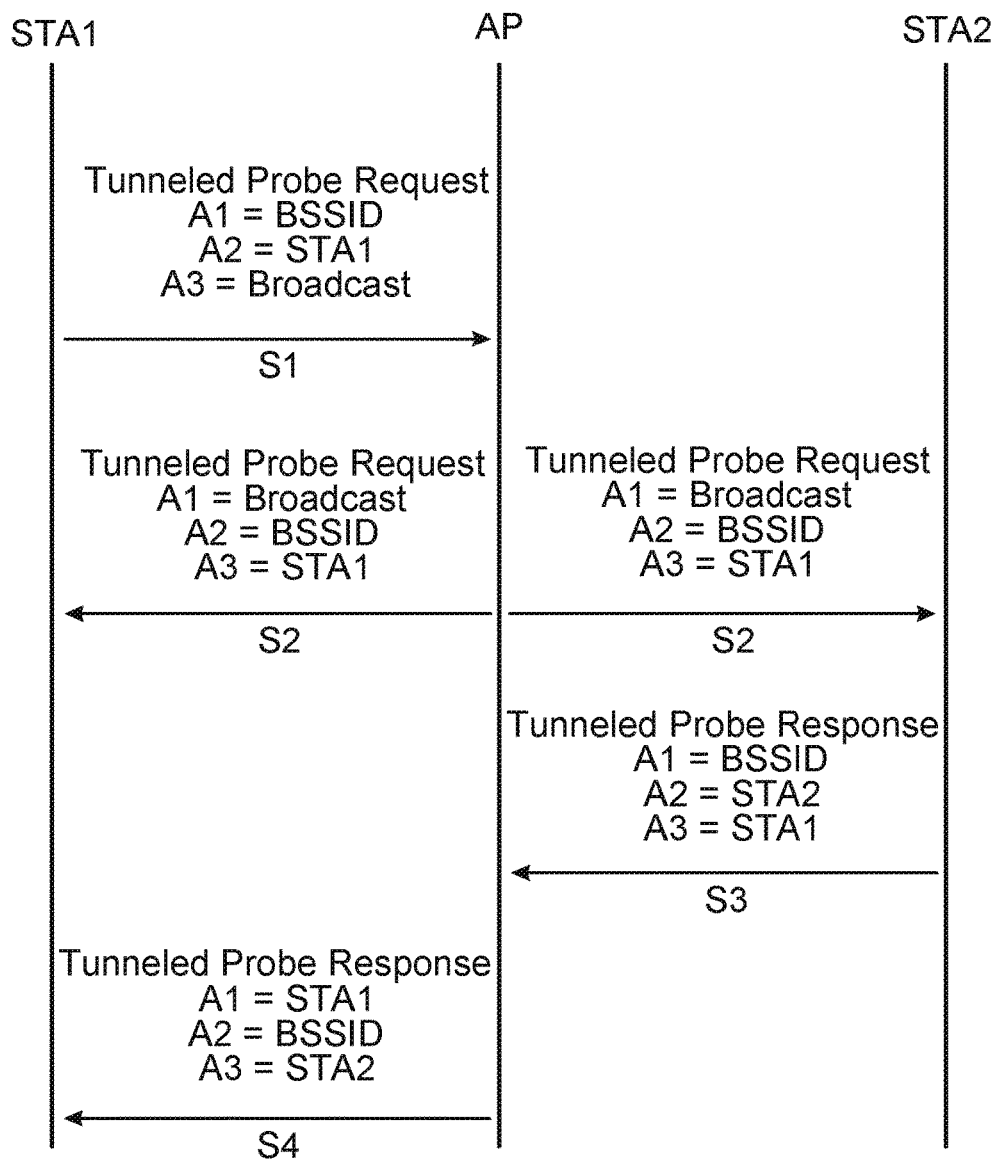
FIG. 4 illustrates an example of a method of transmitting and receiving a probe request and a probe response according to some implementations.

FIG. 4 illustrates an example method of establishing a direct communication link with an encapsulated probe frame. A tunneled probe request is generated and transmitted at S1 by a STA (STA1), functioning here as the source STA. The tunneled probe request includes the required information for establishing a direct communication link between associated STAs. The tunneled probe request is received at the AP with which STA1 is in communication. The AP may then broadcast the information in the tunneled probe request to STAs associated with the AP, as represented by S2. In one aspect, the tunneled probe request is broadcast to all STAs, including the source STA (STA1). As shown for simplicity, there may be two STAs, STA1 and STA2. As described, STA1 may be a source STA, and STA2 may be a receiving STA. STA2 may then transmit a tunneled probe response to the AP, as represented by S3. The AP may then transmit the tunneled probe response to STA1, as represented by S4. In some implementations, the tunneled probe request transmitted by STA1 and the tunneled probe response transmitted by STA2 may include a MAC address of the transmitting STA.

FIGS. 5A-5D illustrate examples of a link identifier of a probe frame. The probe frame may generally include at least the link identifier, represented by A1-A3. The link identifier may also reside in a MAC header of a message as discussed above. An AP may access the link identifier in the MAC header in order to transmit a message without having to access the information of a probe frame. Additionally, a STA may use the link identifier in the probe frame or the MAC header to generate a probe response. The link identifier information found in a MAC header may be the same as or different from the link identifier information found in the probe frame.

Figure 5A:
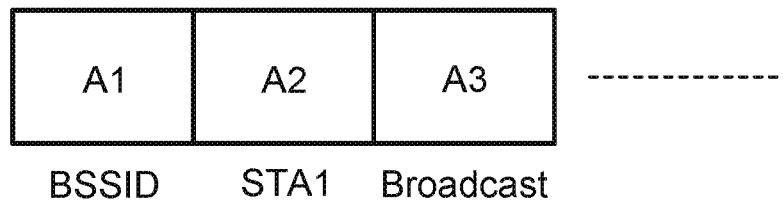
FIG. 5A illustrates is an example of a link identifier of a tunneled probe request frame according to some implementations.

FIG. 5A illustrates an example link identifier of a tunneled probe request frame transmitted from a STA1 to an AP. An address A1 may correspond to a destination address associated with the probe request frame, an address A2 may correspond to an initiating or source address associated with the probe request frame, and an address A3 may correspond to a message type associated with the probe request frame. The message type may include information regarding the destination address of the probe frame. For example, as illustrated in FIG. 5A, a first address A1 in this example is an indicator as to the BSSID (basic service set identifier) associated with the AP. At address A2 is information identifying the source STA, STA1, which may include a MAC address for the source STA. At address A3, information indicates that the probe request frame is of a broadcast type.

Figure 5B:
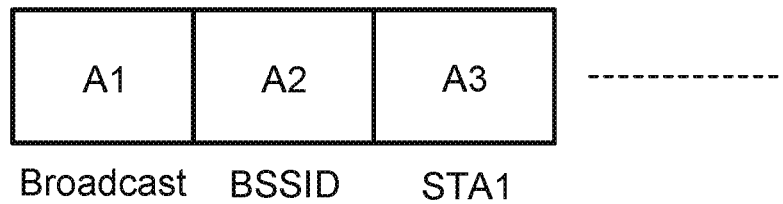
FIG. 5B illustrates an example of a link identifier of a tunneled probe request frame according to some implementations.

FIG. 5B illustrates an example of a link identifier of a tunneled probe request frame broadcast by an AP. Illustrated by a first address A1 in this example is an indicator as to the type of message, which for the tunneled probe request is a broadcast type. At address A2 is information identifying the AP, which in this example is a BSSID associated with the AP. At address A3 is information identifying the source STA, STA1, which may include an associated MAC address.

Figure 5C:
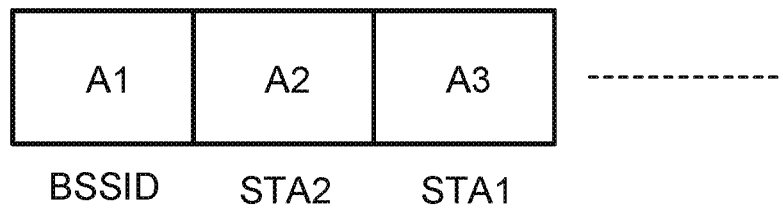
FIG. 5C illustrates an example of a link identifier of a tunneled probe response frame according to some implementations.

FIG. 5C illustrates an example link identifier of a tunneled probe response frame transmitted from a STA2 through the AP. Illustrated by a first address A1 in this example is an indicator as to the BSSID associated with the AP. At address A2, is the information identifying the source STA, STA2, which may include a MAC address for the source STA. At A3, information may indicate a probe response frame is to be sent to a STA1.

Figure 5D:
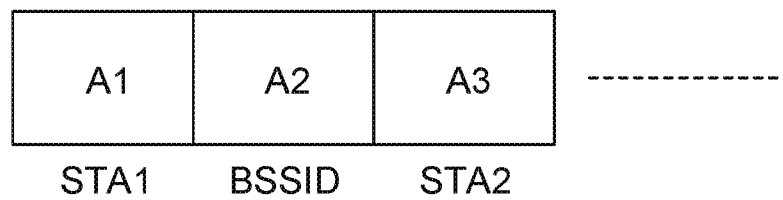
FIG. 5D illustrates an example of a link identifier of a tunneled probe response frame according to some implementations.

FIG. 5D illustrates an example of a link identifier of a probe response transmitted from an AP. Illustrated by a first address A1 in this example is information identifying the receiving STA, STA1. At address A2 is an indicator as to the BSSID associated with the AP. At address A3, information may indicate a source STA, e.g. STA2.

Each probe request and probe response may also include additional information. Furthermore, addresses A1-A3 may be configured to indicate an address of any client device or AP. For example, a tunneled probe request may include a BSSID element that specifies the BSSID of the AP to which the STA transmitting the tunneled probe request is associated. A tunneled probe response may be limited such that it is transmitted only by STAs that are associated with the same BSSID. Additionally or alternatively, a tunneled probe frame may contain information about a peer-to-peer network to which the STA transmitting the probe frame may be concurrently associated.

Figure 6:
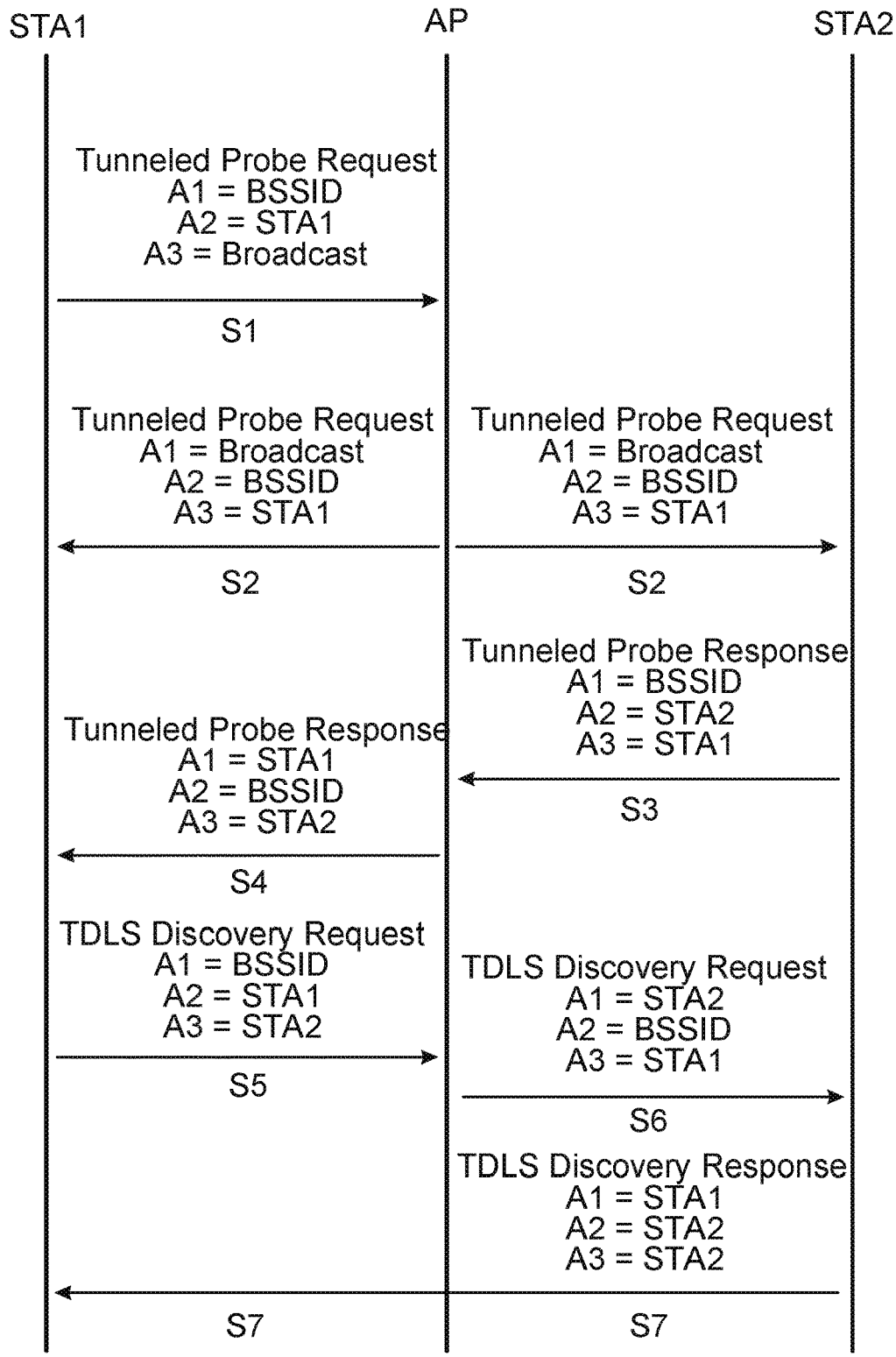
FIG. 6 illustrates an example of a method of transmitting and receiving a probe request and probe response and a TDLS discovery request and a TDLS discover response according to some implementations.

FIG. 6 illustrates an example of a method for establishing a TDLS communication link with a tunneled probe frame according to some implementations. As represented by S1, the method may begin by a source STA, e.g. STA1, generating and transmitting a tunneled probe request. The tunneled probe request may be transmitted through the AP to be broadcast to receiving STAs, as represented by S2 and discussed with respect to FIG. 4 above. A receiving STA (e.g., STA2), may transmit a tunneled probe response through an AP to the source STA, as represented by steps S3-S4 and as discussed with respect to FIG. 4 above.

The method may further incorporate a follow-up TDLS discovery technique as illustrated in FIG. 6. At S5, a TDLS discovery request may be transmitted by a STA, e.g. STA1, functioning here again as the source STA. The TDLS discovery request is received at the AP with which STA1 is in communication. At S6, the AP may then broadcast the information in the discovery request to STAs associated with the AP. In some implementations, the TDLS discovery request is broadcast to all STAs. As described, STA1 is the source STA. STA2 is a receiving STA. STA2 may then send a discovery response directly to STA1. STA1 may be configured to transmit an acknowledgment (not shown) to STA2 in response to the TDLS discovery response. At S7, a STA1 may setup a TDLS direct link with a STA2 based on the discovery response. Additionally, or alternatively, a STA2 may setup a direct communication link immediately after receiving a tunneled probe response at S4.

According to some implementations, a tunneled probe response may also include a TDLS capability. A TDLS discovery operation may be performed based on the TDLS capability included in the tunneled probe response. A TDLS capability may be indicated in an extended capabilities element included in the tunneled probe response.

Figure 7:
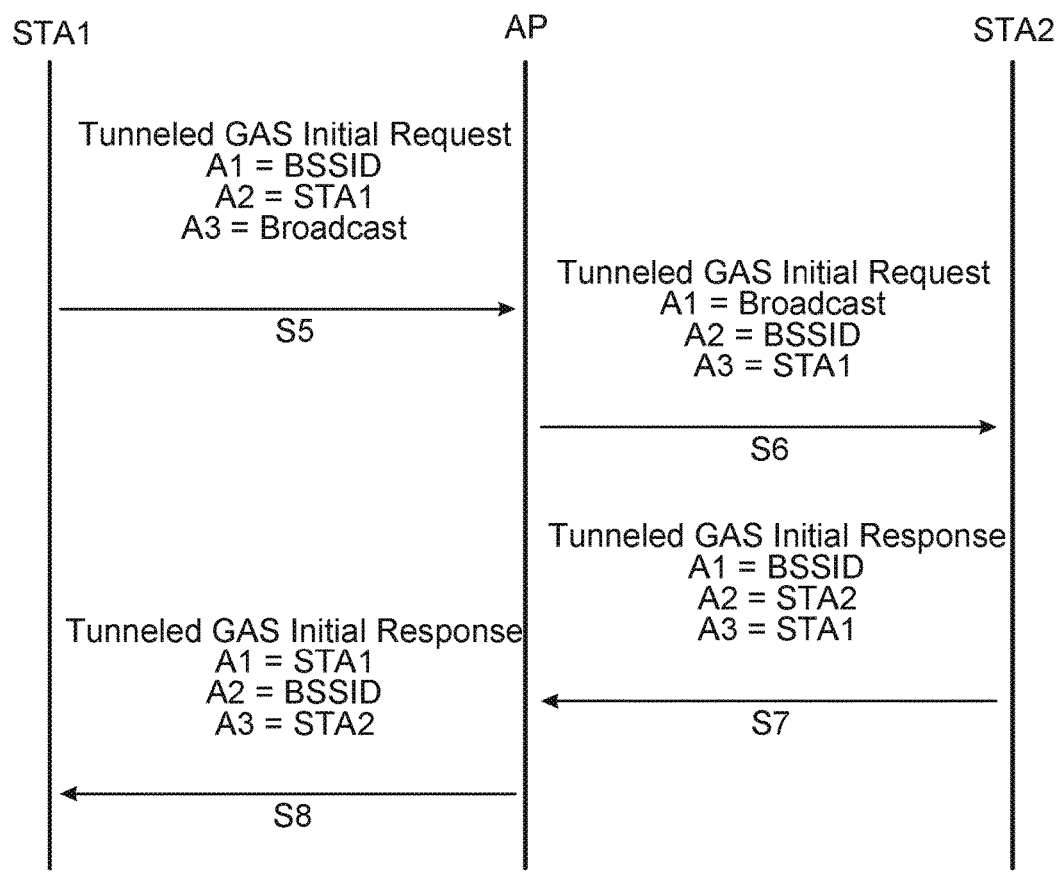
FIG. 7 illustrates an example of a method of transmitting and receiving a GAS initial request and response according to some implementations.

FIG. 7 illustrates an example of a method for establishing a TDLS communication link with a tunneled probe frame according to some implementations. The method may begin by a source STA, e.g. STA1, transmitting a tunneled probe request. The tunneled probe request may be transmitted through the AP to be broadcast to receiving STAs as discussed with respect to steps S1-S2 of FIG. 4 above. A receiving STA, e.g. STA2, may transmit a tunneled probe response through an AP to the source STA as discussed with respect to steps S3-S4 of FIG. 4 above.

The method may further incorporate a follow-up tunneled Generic Advertisement Service (GAS) request technique as illustrated in FIG. 7. For example, a tunneled GAS initial request may be sent following a probe request or in response to a probe request, but is not limited thereto. At S5, a tunneled GAS initial request may be transmitted by a STA, e.g. STA1, functioning here again as the source STA. The GAS initial request is received at the AP with which STA1 is in communication. At S6, the AP may then broadcast the information in the tunneled GAS initial request to STAs associated with the AP. In some implementations, the tunneled GAS initial request is broadcast to all STAs. As described above, STA1 may be source STA and STA2 may be a receiving STA. At S7, STA2 may then send a tunneled GAS initial response to STA1 through the AP. A STA1 may setup a GAS direct link with a STA2 based on the discovery response at S8. Additionally, or alternatively, a STA2 may setup a direct communication link immediately after tunneled probing at S4 as describe in FIG. 4 above.

According to some implementations, a tunneled GAS initial request may be transmitted to a unicast destination address rather than a broadcast address based on information obtained from tunneled probing. For example, a GAS initial request may be sent to a peer-to-peer network first prior to being broadcast to all associated STAs. This operation may reduce the response volume of tunneled GAS initial response frames.

In addition to tunneled probing and TDLS discovery, as described above, associated STAs may perform an active scan on certain social channels. A social channel may be a channel which is designated for non-associated STAs to monitor for a probe or discovery request. For example, the social channels may be channels 1, 6, and 11 in a 2.4 GHz band. Performing an active scan may include the transmission of one or more probe requests to at least one of the social channels. In some implementations, a STA performs an active scan by transmitting a probe request on each of the social channels.

Figure 8:
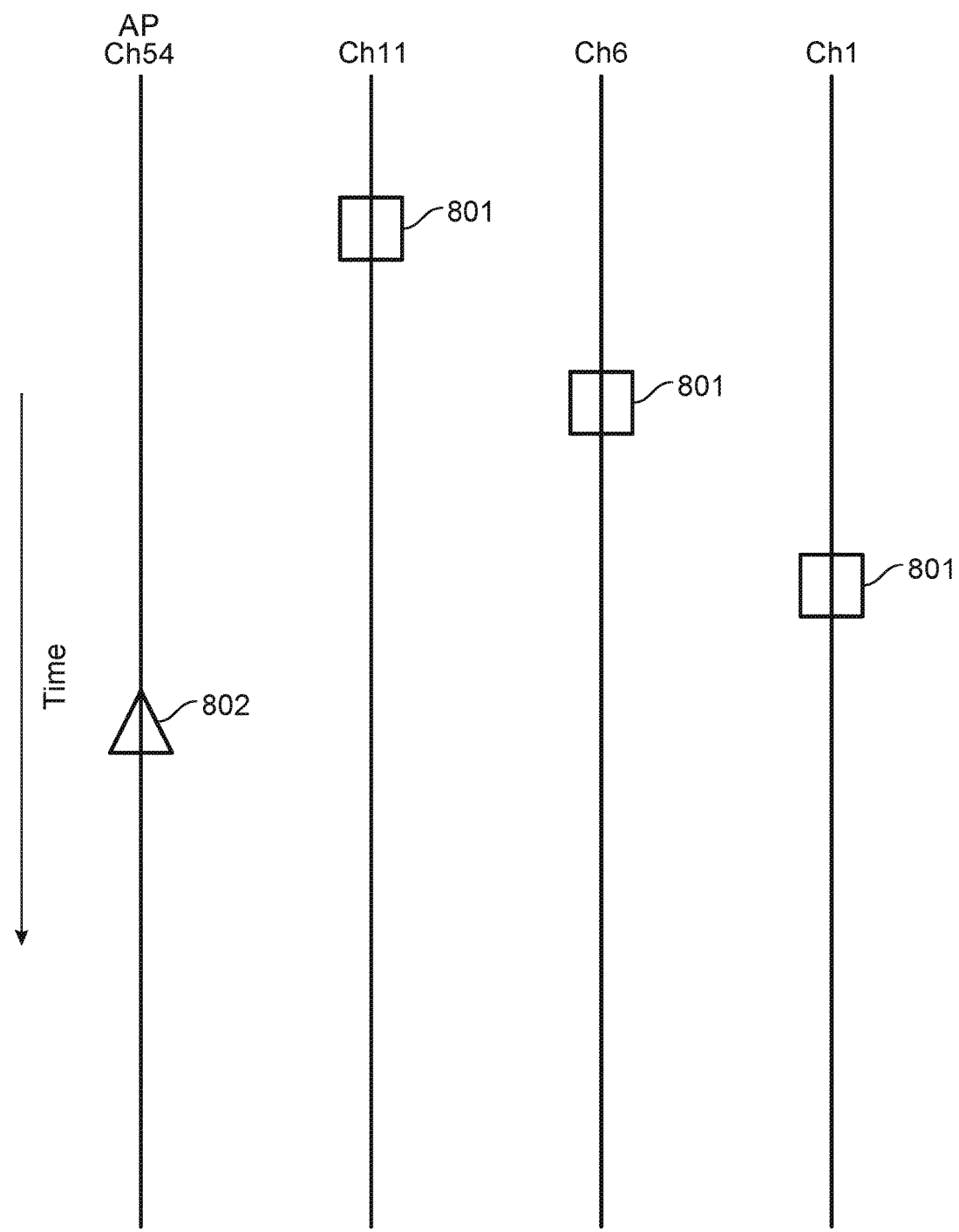
FIG. 8 illustrates an example of a method of monitoring for communication devices according to some implementations.

FIG. 8 illustrates an example of a method of performing tunneled probing and active scanning. An associated STA may be communicating on a channel associated with an AP. For example, with reference to FIG. 8, an associated STA may be communicating on Ch. 54. The STA may perform active scanning on social channels to scan for other associated STAs and non-associated STAs. For example, the STA may temporarily disconnect from an AP channel and may generate and transmit a probe request on a social channel. With reference to FIG. 8, the STA may switch to, for example, channel 11. The STA may generate and transmit a probe request 801 to the social channel. The STA may then wait for a probe response. If a probe response has not been received within a predetermined time, the STA may continue scanning the other social channels. For example, the STA may generate and transmit a probe request 801 to social channels 6 and 1. The STA may wait for a predetermined time to receive a response to each probe request 801. The STA may subsequently switch to an AP channel, e.g. channel 54, and generate and transmit a tunneled probe request 802. The tunneled probe request 802 may be transmitted through the AP as discussed above.

According to the method illustrated in FIG. 8, a STA may ensure that other associated STAs and non-associated STAs are discovered. The STA may also be configured to disconnect from an AP channel for a short period to perform the active scanning. Additionally, the STA may be configured to communicate (via an AP mode communication module) to the AP that the disconnection is a sleep-mode or idle-mode in order to quickly re-establish a connection with the AP once active scanning has been performed.

According to some implementations, a STA which is associated with another basic service set (BSS) may be entered into a peer-to-peer listen mode in response to a user input. In a peer-to-peer listen mode, the STA's association with the AP may essentially be interrupted. As discussed above, the interruption may be communicated to the AP as a sleep-mode, power-save mode, or idle-mode in order to quickly re-establish a connection with the AP. A scanning non-associated STA may receive a probe request from an associated STA in a peer-to-peer listen mode. An associated STA in peer-to-peer listen mode is likely to be in a power save mode or idle-mode with respect to the associated AP as discussed above. However, the periodic listen mode may increase the power consumption of the associated STA. An associated STA may not be discovered by a non-associated STA due to the fact that the STA is in a power-save mode or idle-mode while in peer-to-peer listen mode. In some implementations, an associated STA in an active state and communicating on a BSS channel may not have to periodically transmit a probe request on the social channels. The associated STA may rely on a response to the transmitted probe request received by another STA on the BSS channel. As a result, an associated STA may reduce the power consumption of a peer-to-peer listen mode by not entering a listen mode and relying on the above described probe request.

According to some implementations, a STA which is associated with a peer-to-peer network may be discovered when an access point type indicates its presence in a probe response. For example, an access point type may be set to a GO type, and the presence of the STA may be indicated by a probe response transmitted by the AP.

According to some implementations, a WiFi simple configuration (WSC) with a requested device type may be included in a probe frame. By including a WSC, the volume of tunneled probe responses may be moderated by qualifying the types of devices that should respond. The WSC may be used to select a subset of the receiving STAs that may transmit a tunneled probe response.

The configuration of a client device or STA will now be described with reference to FIG. 9. The STA 901 may be configured to perform the functions described above. A STA 901 may include a processing module 902 and a message transmission module 905. The processing module 902 may include a probe frame generating module 903, a message generating module 904, and a channel selection module 906. The probe frame generating module 903 may be coupled to the message generating module 904 and may be configured to generate a probe frame to be encapsulated in a message. The message generating module 904 may be configured to generate a message including the encapsulated probe frame. The message generating module may be coupled to the message transmission module 905. The message transmission module 905 may be configured to transmit the message including the encapsulated probe frame to an AP in order to communicate a tunneled probe request or tunneled probe response. Further, the channel selection module 906 may be configured to select a channel for transmission of the message. For example, as discussed above with reference to FIG. 8, the channel selection module 906 may be configured to select a channel associated with an AP during a first time period to transmit a probe request and receive a probe response through the AP. Further, the channel selection module 906 may be configured to select social channels during other time periods. When a social channel is selected, the message transmission module 905 is configured to transmit probe requests and probe responses on the social channels directly from other STAs. Further, while not illustrated, a client device or STA may include a message reception module configured to receive a probe frame transmitted from an AP or another client device or STA. The message reception module may be provided separately from the message transmission module 905, or may be integral with the message transmission module 905.

Figure 10:
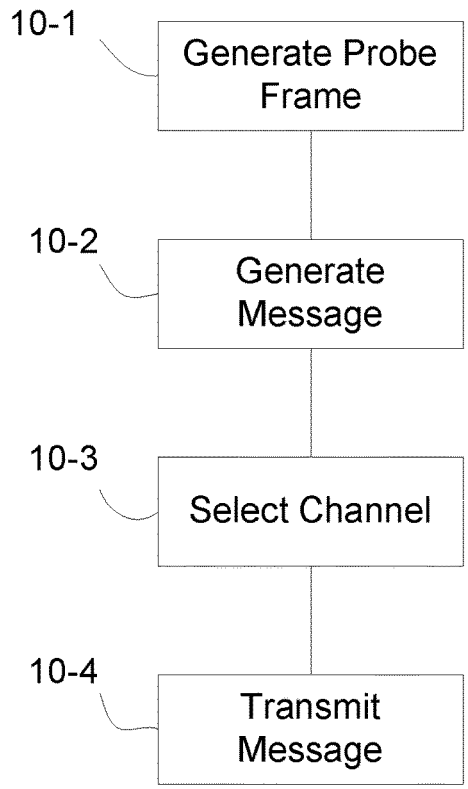
FIG. 10 illustrates a flowchart of a method of transmitting a probe frame according to some implementations.

FIG. 10 is an example of a method according to some implementations. At block 10-1, a probe frame is generated. At block 10-2, a message is generated, the message including the encapsulated probe frame as discussed above. At block 10-3, a transmission channel may be selected. For example, a transmission channel of the AP may be selected during a first time period for transmitting the message through the AP, and a social channel may be selected during a second time period for transmitting the message to other STAs that are camped on the social channel. At block 10-4, the message, including the probe frame, is transmitted, either through an AP as a tunneled probe request or tunneled probe response or directly to another STA camped or communicating on a social channel.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

One skilled in the art would understand that the steps disclosed in the example algorithms can be interchanged in their order without departing from the scope and spirit of the present disclosure. Also, one skilled in the art would understand that the steps illustrated in the example algorithms are not exclusive and other steps may be included or one or more of the steps in the example algorithms may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. For example, a message transmission module 905 and a message reception module may be a transmitter, receiver, or antenna device. A processing module 902 and 1104 may be a CPU, MPU, or the like. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various example algorithms, flow diagrams, logical blocks and/or modules described herein. For example, with reference to FIG. 11, a processing module 1104 may be coupled to a memory unit 1100. The memory unit 1100 may contain instructions for causing a computer to perform various functions. For example, the memory unit 1100 may contain a generate probe frame instruction 1101 for generating a probe frame as discussed above. The memory unit 1100 may also include a generate message instruction 1102 for generating a message which contains an encapsulated probe frame as discussed above. The memory unit 1100 may also contain a select channel instruction 1103, that when executed, determines the channel on which the message is to be transmitted during particular time periods. The memory unit 1100 may further contain a transmit message instruction 1104 for transmitting the generated message.

The memory unit 1100 may be formed as a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

Figure 9:
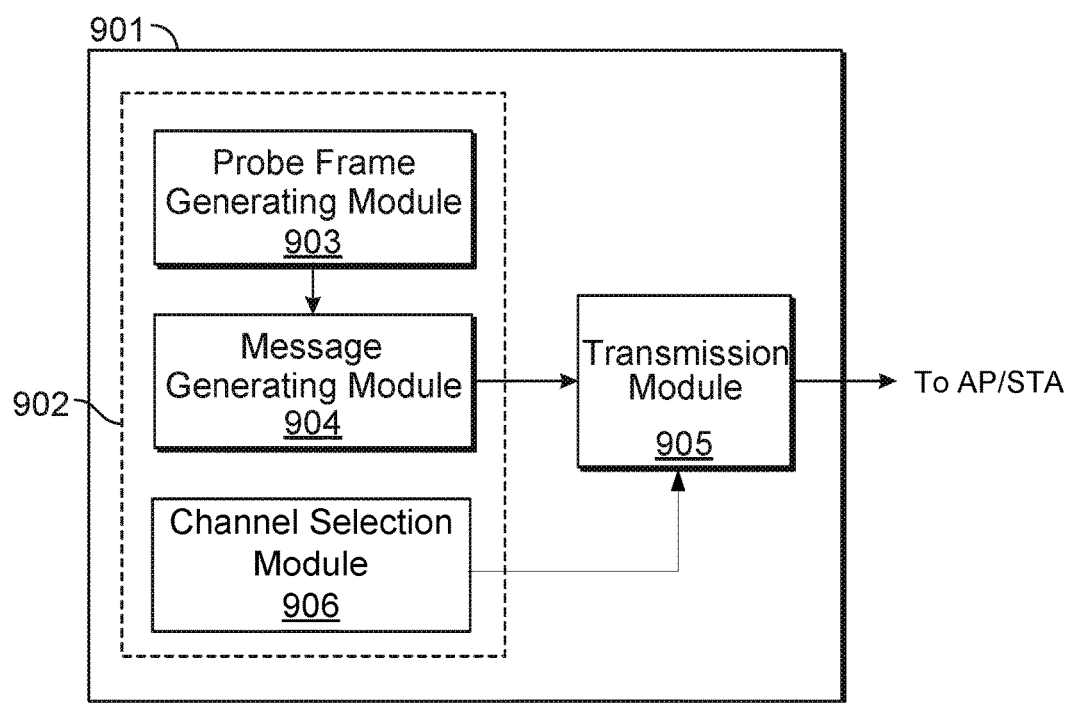
FIG. 9 illustrates an example of a device according to some implementations.
Figure 11:
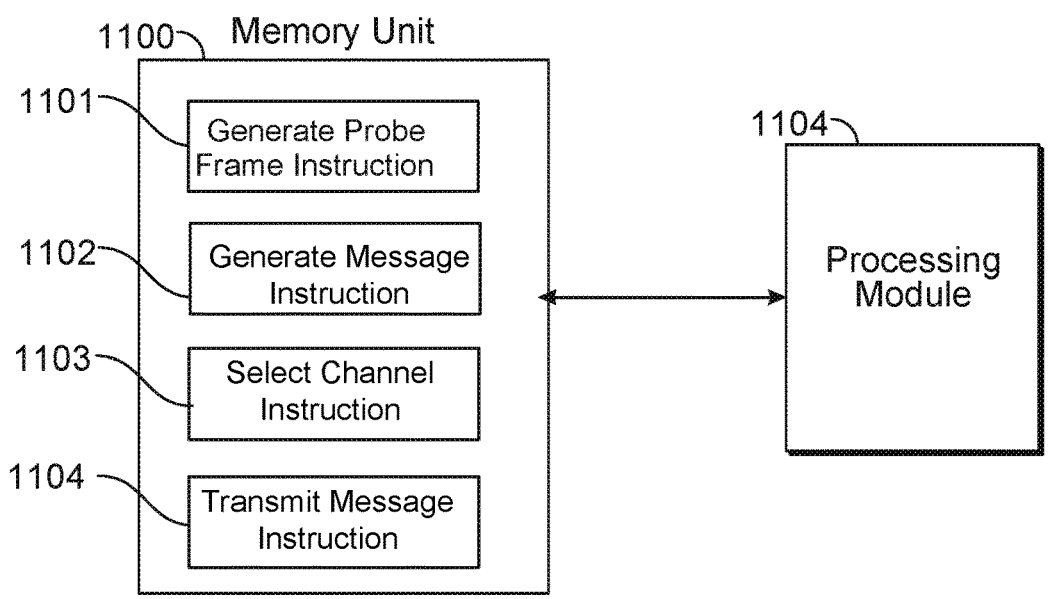
FIG. 11 illustrates an example of a computer program product according to some implementations.

As a hardware implementation, the processing modules 902 of FIG. 9 and 1104 of FIG. 11 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

The functionality described herein (e.g., with regard to one or more of the accompanying figures) may correspond in some aspects to similarly designated "means for" functionality in the appended claims. For example, a processing module 902 of FIG. 9 and 1104 of FIG. 11 may correspond to means for generating a message, means for encapsulating a probe frame, means for generating a message, and means for selecting a channel. For example, a probe frame generating module 903 of FIG. 9 may correspond to a means for generating a probe frame. A message generating module 904 of FIG. 9 may correspond to a means for generating a message. A message transmission module 905 of FIG. 9 may correspond to a means for transmitting a message.

It will be understood that other aspects will become readily apparent to those skilled in the art from the descriptions herein. One skilled in the art would understand that the present disclosure, the drawings and the descriptions in the present disclosure are to be regarded as illustrative in nature and not as restrictive.

The description set forth in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

The description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for wireless communication, comprising:
   generating a tunneled probe request by a first station, wherein the tunneled probe request includes an identifier of the first station and an indicator that the probe request is a broadcast type;
   sending the tunneled probe request to an access point by the first station;
   receiving a tunneled probe response by the first station, wherein the tunneled probe response includes an identifier of a second station, and wherein the second station is associated with the access point; and
   in response to receiving the tunneled probe response, establishing a direct link with the second station by the first station.

2. The method of claim 1, wherein the tunneled probe response is received by the first station directly from the second station.

3. The method of claim 1, wherein the tunneled probe response is received by the first station directly from the access point.

4. The method of claim 1, wherein in response to receiving the tunneled probe response, establishing the direct link with the second station by the first station further comprises:
   generating a discovery request by the first station, wherein the discovery request includes an identifier of the first station and an identifier of the second station;
   sending the discovery request to the access point by the first station;
   receiving a discovery response by the first station from the second station; and
   establishing the direct link with the second station by the first station based on the discovery response.

5. The method of claim 1, wherein the tunneled probe response includes an extended capabilities element, and establishing the direct link with the second station by the first station comprises establishing the direct link with the second station by the first station based on the extended capabilities element.

6. The method of claim 1, wherein the tunneled probe request is sent on a first channel, and further comprising sending a probe request on a second channel by the first station.

7. The method of claim 6, wherein the first channel is associated with the access point, and the second channel is a social channel.

8. The method of claim 1, wherein the tunneled probe request is sent on a channel associated with the access point, and further comprising sending a probe request on each of a plurality of social channels.

9. The method of claim 8, wherein the tunneled probe request is sent on the channel associated with the access point only after sending the probe request on each of the plurality of social channels and determining that no probe responses have been received in response to any of the probe requests sent on the plurality of social channels.

10. A first station comprising:
a transceiver; and
a processor coupled to the transceiver, the processor configured to:
generate a tunneled probe request, wherein the tunneled probe request includes an identifier of the first station and an indicator that the probe request is a broadcast type;
send the tunneled probe request to an access point;
receive a tunneled probe response, wherein the tunneled probe response includes an identifier of a second station, and wherein the second station is associated with the access point; and
in response to receiving the tunneled probe response, establish a direct link with the second station.

11. The first station of claim 10, wherein the tunneled probe response is received directly from the second station.

12. The first station of claim 10, wherein the tunneled probe response is received directly from the access point.

13. The first station of claim 10, wherein the processor configured to in response to receiving the tunneled probe response, establish the direct link with the second station further comprises the processor configured to:
generate a discovery request, wherein the discovery request includes an identifier of the first station and an identifier of the second station;
send the discovery request to the access point;
receive a discovery response from the second station; and
establish the direct link with the second station based on the discovery response.

14. The first station of claim 10, wherein the tunneled probe response includes an extended capabilities element, and the processor configured to establish the direct link with the second station comprises the processor configured to establish the direct link with the second station based on the extended capabilities element.

15. The first station of claim 10, wherein the tunneled probe request is sent on a first channel, and wherein the processor is further configured to send a probe request on a second channel.

16. The first station of claim 15, wherein the first channel is associated with the access point, and the second channel is a social channel.

17. The first station of claim 10, wherein the tunneled probe request is sent on a channel associated with the access point, and wherein the processor is further configured to send a probe request on each of a plurality of social channels.

18. The first station of claim 17, wherein the processor is configured to send the tunneled probe request on the channel associated with the access point only after sending the probe request on each of the plurality of social channels and determining that no probe responses have been received in response to any of the probe requests sent on the plurality of social channels.

19. A non-transitory computer-readable medium having stored thereon processor executable software instructions configured to cause processing circuitry in a first station to:
generate a tunneled probe request by the first station, wherein the tunneled probe request includes an identifier of the first station and an indicator that the probe request is a broadcast type;
send the tunneled probe request to an access point by the first station;
receive a tunneled probe response by the first station, wherein the tunneled probe response includes an identifier of a second station, and wherein the second station is associated with the access point; and
in response to receiving the tunneled probe response, receive a direct link with the second station by the first station.

20. The non-transitory computer-readable medium of claim 19, wherein the tunneled probe response is received by the first station directly from the second station.

21. The non-transitory computer-readable medium of claim 19, wherein the tunneled probe response is received by the first station directly from the access point.

22. The non-transitory computer-readable medium of claim 19, wherein the stored processor-executable software instructions are further configured to cause the processing circuitry in the first station in response to receiving the tunneled probe response, to establish the direct link with the second station by the first station further by:
generating a discovery request by the first station, wherein the discovery request includes an identifier of the first station and an identifier of the second station;
sending the discovery request to the access point by the first station;
receiving a discovery response by the first station from the second station; and
establishing the direct link with the second station by the first station based on the discovery response.

23. The non-transitory computer-readable medium of claim 19, wherein the tunneled probe response includes an extended capabilities element, and the stored processor-executable software instructions are further configured to cause the processing circuitry in the first station to establish the direct link with the second station by the first station by establishing the direct link with the second station by the first station based on the extended capabilities element.

24. The non-transitory computer-readable medium of claim 19, wherein the tunneled probe request is sent on a first channel, and the stored processor-executable software instructions are further configured to cause the processing circuitry in the first station to send a probe request on a second channel by the first station.

25. The non-transitory computer-readable medium of claim 24, wherein the first channel is associated with the access point, and the second channel is a social channel.

26. The non-transitory computer-readable medium of claim 19, wherein the tunneled probe request is sent on a channel associated with the access point, and the stored processor-executable software instructions are further configured to cause the processing circuitry in the first station to send a probe request on each of a plurality of social channels.

27. The non-transitory computer-readable medium of claim 26, wherein the tunneled probe request is sent on the channel associated with the access point only after sending the probe request on each of the plurality of social channels and determining that no probe responses have been received in response to any of the probe requests sent on the plurality of social channels.

28. A first station comprising:
means for generating a tunneled probe request, wherein the tunneled probe request includes an identifier of the first station and an indicator that the probe request is a broadcast type;
means for sending the tunneled probe request to an access point;
means for receiving a tunneled probe response, wherein the tunneled probe response includes an identifier of a second station, and wherein the second station is associated with the access point; and
means for, in response to receiving the tunneled probe response, establishing a direct link with the second station.

29. The first station of claim 28, wherein the tunneled probe response is received directly from the second station.

30. The first station of claim 28, wherein the tunneled probe response is received directly from the access point.

31. The first station of claim 28, wherein the means for, in response to receiving the tunneled probe response, establishing the direct link with the second station further comprises:
means for generating a discovery request, wherein the discovery request includes an identifier of the first station and an identifier of the second station;
means for sending the discovery request to the access point;
means for receiving a discovery response from the second station; and
means for establishing the direct link with the second station based on the discovery response.

32. The first station of claim 28, wherein the tunneled probe response includes an extended capabilities element, and the means for establishing the direct link with the second station comprises means for establishing the direct link with the second station based on the extended capabilities element.

33. The first station of claim 28, wherein the tunneled probe request is sent on a first channel, and further comprising means for sending a probe request on a second channel.

34. The first station of claim 33, wherein the first channel is associated with the access point, and the second channel is a social channel.

35. The first station of claim 28, wherein the tunneled probe request is sent on a channel associated with the access point, and further comprising means for sending a probe request on each of a plurality of social channels.

36. The first station of claim 35, wherein the tunneled probe request is sent on the channel associated with the access point only after sending the probe request on each of the plurality of social channels and determining that no probe responses have been received in response to any of the probe requests sent on the plurality of social channels.

* * * * *